| (12) | United States Patent | (10) Patent No.: | US 9,428,020 B2 |
|---|---|---|---|
| | Saieg | (45) Date of Patent: | Aug. 30, 2016 |

(54) AXLE ALIGNMENT SYSTEM

(71) Applicant: ArvinMeritor Technology, LLC, Troy, MI (US)

(72) Inventor: Steven Saieg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/529,347

(22) Filed: Oct. 31, 2014

(65) Prior Publication Data

US 2016/0121675 A1 May 5, 2016

(51) Int. Cl.
*B60G 3/20* (2006.01)
*B60G 7/00* (2006.01)

(52) U.S. Cl.
CPC ............... *B60G 3/20* (2013.01); *B60G 7/008* (2013.01); *B60G 2300/04* (2013.01)

(58) Field of Classification Search
CPC .... B60G 3/20; B60G 7/008; B60G 2300/04; B60G 2204/14; B60G 2204/143; B60G 22/148
See application file for complete search history.

(56) References Cited

U.S. PATENT DOCUMENTS

| 5,354,091 A * | 10/1994 | Baxter | B60G 5/03 267/37.2 |
|---|---|---|---|
| 6,659,479 B1 * | 12/2003 | Raidel, II | B60G 7/02 280/124.16 |
| 7,207,593 B2 * | 4/2007 | Saxon | B62D 53/068 280/149.2 |
| 7,210,692 B2 * | 5/2007 | Galazin | B60G 7/006 280/124.1 |
| 7,296,809 B2 * | 11/2007 | Zebolsky | B60G 7/006 280/124.116 |
| 8,528,920 B2 | 9/2013 | Borges et al. | |
| 8,616,647 B2 * | 12/2013 | Chen | B62B 9/104 280/47.38 |
| 2001/0052685 A1 * | 12/2001 | Svartz | B60G 7/02 280/124.116 |
| 2005/0146105 A1 * | 7/2005 | Soles | B60G 7/02 280/86.75 |
| 2005/0263986 A1 * | 12/2005 | Miller | B60G 5/047 280/683 |
| 2006/0244235 A1 * | 11/2006 | Kusaka | B60G 3/20 280/124.136 |
| 2009/0091101 A1 * | 4/2009 | Leonard | B60G 3/20 280/638 |
| 2011/0079978 A1 * | 4/2011 | Schreiner | B60G 3/20 280/124.1 |
| 2012/0104713 A1 * | 5/2012 | Frens | B60G 7/003 280/86.75 |

OTHER PUBLICATIONS

BPW Axles With Air Suspension—Installation Instructions, publication date unknown.
Meritor, Ridesentry MPA Series With Pinloc System, copyright 2007, revised Feb. 2010, printed in USA.

* cited by examiner

*Primary Examiner* — Darlene P. Condra
(74) *Attorney, Agent, or Firm* — Brooks Kushman P.C.

(57) ABSTRACT

An axle alignment system for an axle assembly. The axle alignment system may include a bracket assembly and an alignment plate. The alignment plate may be moveably disposed on the bracket assembly with one or more fasteners that may move along one or more slots that may be provided with the bracket assembly and/or the alignment plate.

10 Claims, 6 Drawing Sheets

AXLE ALIGNMENT SYSTEM

TECHNICAL FIELD

This patent application relates to an axle alignment system.

BACKGROUND

An adjustment assembly is disclosed in U.S. Pat. No. 8,528,920.

SUMMARY

In at least one embodiment, an axle alignment system is provided. The axle alignment system may include an axle assembly, a bracket assembly, an alignment plate, a lower control arm, and an upper control arm. The bracket assembly may include a first plate and a second plate. The first plate may define a first elongate slot, a second elongate slot, and a clearance hole. The second plate may be disposed proximate the first plate. The second plate may define a third elongate slot, a fourth elongate slot, and a pry feature. The alignment plate may be disposed proximate the first plate. The alignment plate may have a first opening, a second opening, and a third opening. The first opening may be disposed proximate the first elongate slot. The second opening may be disposed proximate the second elongate slot. The third opening may be proximately aligned with the clearance hole. The lower and upper control arms may extend between the axle assembly and the bracket assembly. The first elongate slot and the third elongate slot may receive a first fastener that may mount the lower control arm to the bracket assembly. The second elongate slot and fourth elongate slot may receive a second fastener that may mount the upper control arm to the bracket assembly. The alignment plate may position the first fastener along the first and third elongate slots and may position the second fastener along the second and fourth elongate slots to position the axle assembly with respect to the bracket assembly.

In at least one embodiment, an axle alignment system is provided. The axle alignment system may include an axle assembly, a bracket assembly, an alignment plate, a lower control arm, and an upper control arm. The bracket assembly may include a first plate that may have a first elongate slot and a second elongate slot. The first and second elongate slots may each have a major axis and a minor axis. The alignment plate may have a first surface, a second surface, an alignment feature, a first opening, and a second opening. The first surface may be disposed proximate the first plate. The second surface may be disposed opposite the first surface. The alignment feature may be disposed proximate the second surface and may extend from the first plate. The first opening may be aligned with the first elongate slot. The second opening may be aligned with the second elongate slot. The first opening and the second opening may each be configured as an elongate slot that may have a major axis and a minor axis. The major axis and the minor axis may be disposed substantially perpendicular to each other. The major axis of the first and second openings may be disposed nonparallel to the major axes of the first and second elongate slots, respectively. The lower and upper control arms may extend between the axle assembly and the bracket assembly. The first elongate slot and the first opening may receive a first fastener that may mount the lower control arm to the bracket assembly. The second elongate slot and the second bracket opening may receive a second fastener that may mount the upper control arm to the bracket assembly.

In at least one embodiment, an axle alignment system is provided. The axle alignment system may include a bracket assembly, an alignment plate, and a linkage. The bracket assembly may include a first plate having a first elongate slot, a second elongate slot, and a first bracket. The alignment plate may have a first opening, a second opening, and an alignment plate bracket. The first opening may be aligned with the first elongate slot. The second opening may be aligned with the second elongate slot. The linkage may extend along an axis between the first bracket and the alignment plate bracket. The first elongate slot and the first opening may receive a first fastener. The second elongate slot and the second opening may receive a second fastener. The linkage may move the alignment plate with respect to the bracket assembly when the linkage is rotated about the axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
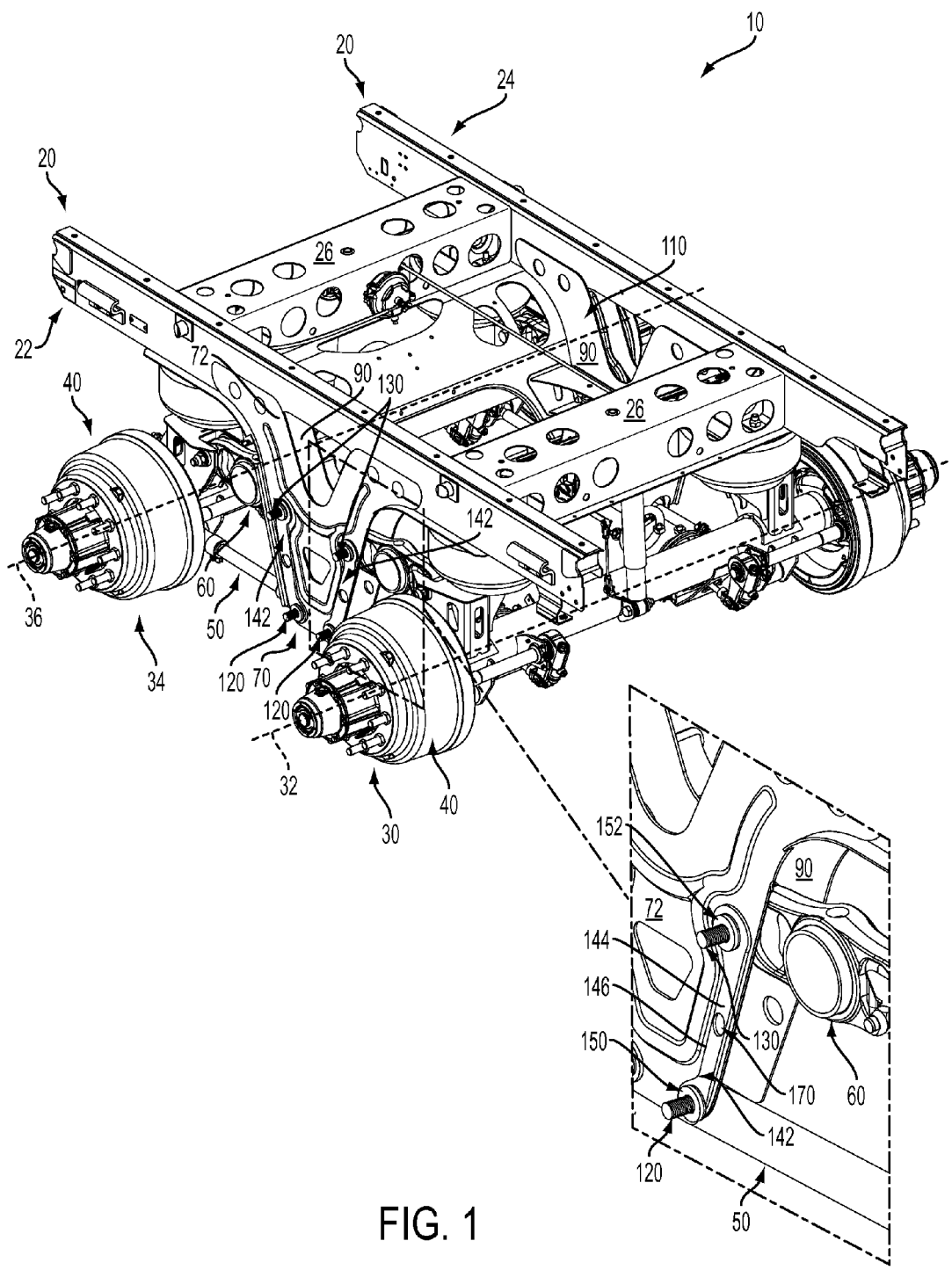
FIG. 1 is a perspective view of an axle suspension system having an axle alignment system.

Referring to FIG. 1, an exemplary axle suspension system 10 is shown. The axle suspension system 10 may be provided with a vehicle, such as a trailer that may be provided with a motor vehicle. The axle suspension system 10 may include a frame assembly 20, a first axle assembly 30, a second axle assembly 34, a first control arm assembly 50, and a second control arm assembly 60.

The first axle assembly 30 may be spaced apart from the second axle assembly 34. The first axle assembly 30 may extend along an axis 32. The second axle assembly 34 may extend along an axis 36.

A wheel hub assembly 40 may be provided at each end of the first axle assembly 30 and the second axle assembly 34. Each wheel hub assembly 40 may be configured to receive a wheel upon which a tire may be mounted. In FIG. 1, the wheel and the tire are removed for clarity.

The frame assembly 20 may be provided with a first rail 22 that may be spaced apart from a second rail 24. The first rail 22 may be connected to the second rail 24 by a cross member 26. The cross member 26 may facilitate the mounting of suspension system components, such as a shock absorber, suspension ride height control system, and an air spring assembly.

A first bracket assembly 70 may be mounted to the first rail 22. A second bracket assembly 110 may be mounted to the second rail 24. The first bracket assembly 70 and the second bracket assembly 110 may each have a first plate 72 and a second plate 90. The first plate 72 may be disposed proximate and may be spaced apart from the second plate 90.

Figure 2A:
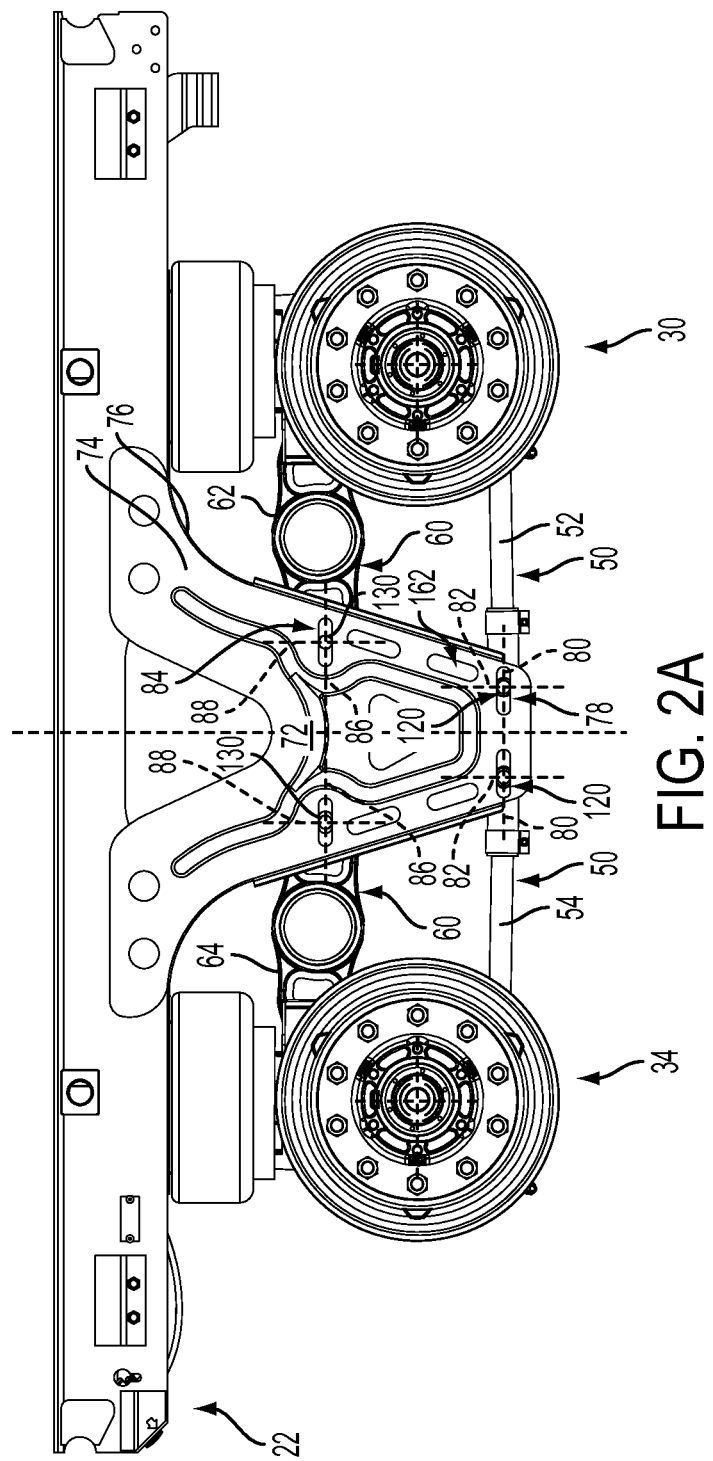
FIGS. 2A and 2B are side views of the axle alignment system of FIG. 1 with various components removed.

Referring to FIG. 2A, the outboard first plate 72 may have a first surface 74 and a second surface 76 that may be disposed opposite the first surface 74. The outboard first plate 72 may define at least one first elongate slot 78 that may extend from the first surface 74 to the second surface 76. The first elongate slot 78 may have a first elongate slot width extending along a first elongate slot major axis 80 from a first end of the first elongate slot 78 to a second end of the first elongate slot 78 that may be disposed opposite the first end. The first elongate slot 78 may have a first elongate slot height extending along a first elongate slot minor axis 82. The first elongate slot minor axis 82 may be disposed substantially perpendicular to the first elongate slot major axis 80. The first elongate slot width may be greater or longer than the first elongate slot height.

The outboard first plate 72 may define at least one second elongate slot 84 that may be spaced apart from the first elongate slot 78. The second elongate slot 84 may have a second elongate slot width extending along a second elongate slot major axis 86 from a first end of the second elongate slot 84 to a second end of the second elongate slot 84 that may be disposed opposite the first end. The second elongate slot 84 may have a second elongate slot height extending along a second elongate slot minor axis 88. The second elongate slot minor axis 88 may be disposed substantially perpendicular to the second elongate slot major axis 86. The second elongate slot width may be greater or longer than the second elongate slot height.

The first elongate slot major axis 80 and the second elongate slot major axis 86 may be disposed substantially parallel to each other. The first elongate slot major axis 80 and the second elongate slot major axis 86 may not be coaxially disposed with each other. Additionally, the first elongate slot minor axis 82 and the second elongate slot minor axis 88 may be disposed generally parallel to each other. The first elongate slot minor axis 82 and the second elongate slot minor axis 88 may not be coaxially disposed with each other.

The outboard first plate 72 may have additional elongate slots that may be spaced apart from the first elongate slot 78 and the second elongate slot 84. For example, a pair of first elongate slots 78 and a pair of second elongate slots 84 may be provided. The additional elongate slots may be mirrored about an axis of symmetry with a similar configuration as the first elongate slot 78 and the second elongate slot 84.

Figure 2B:
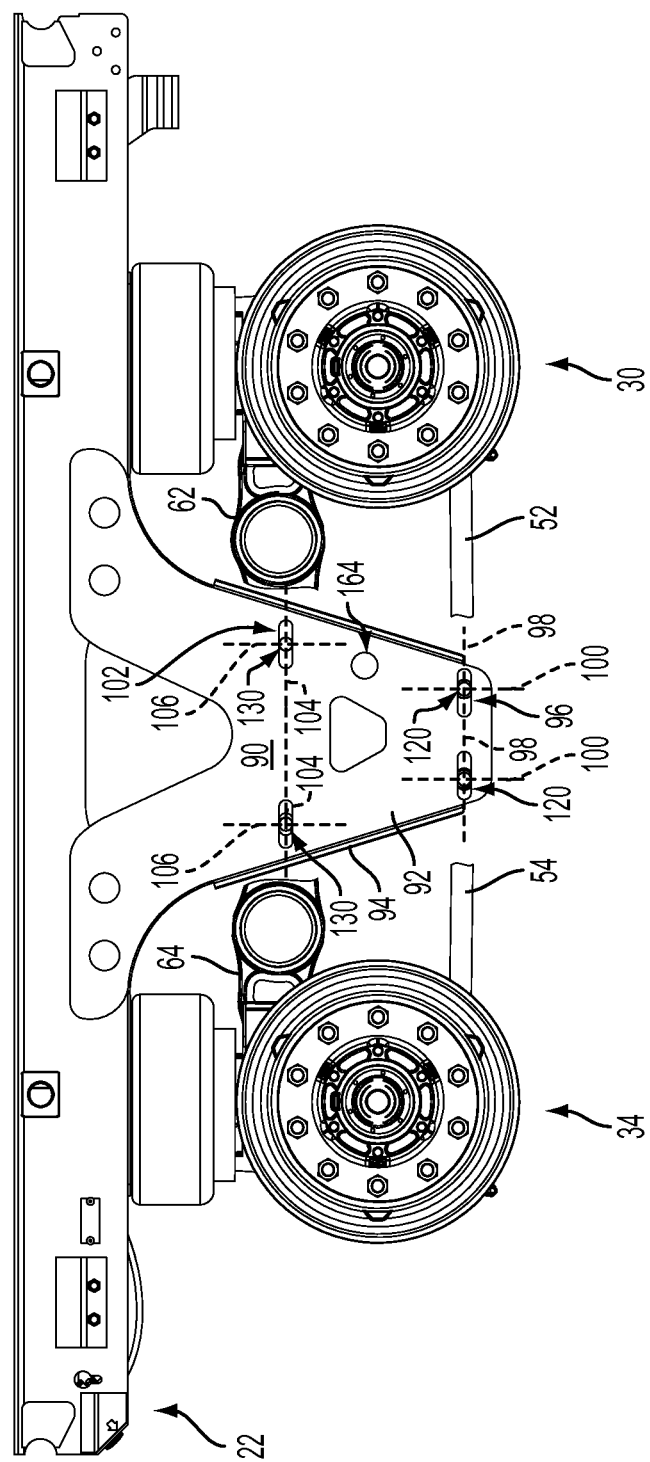

Referring to FIG. 2B, the inboard second plate 90 may have a first surface 92 and a second surface 94 that may be disposed opposite the first surface 92. The inboard second plate 90 may have at least one third elongate slot 96 that may extend from the first surface 92 to the second surface 94. The third elongate slot 96 may have a third elongate slot width extending along a third elongate slot major axis 98 from a first end of the third elongate slot 96 to a second end of the third elongate slot 96 that may be disposed opposite the first end. The third elongate slot 96 may have a third elongate slot height extending along a third elongate slot minor axis 100. The third elongate slot minor axis 100 may be disposed substantially perpendicular to the third elongate slot major axis 98. The third elongate slot width may be greater or longer than the third elongate slot height.

The inboard second plate 90 may define at least one fourth elongate slot 102 that may be spaced apart from the third elongate slot 96. The fourth elongate slot 102 may have a fourth elongate slot width extending along a fourth elongate slot major axis 104 from a first end of the fourth elongate slot 102 to a second end of the fourth elongate slot 102 that may be disposed opposite the first end. The fourth elongate slot 102 may have a fourth elongate slot height extending along a fourth elongate slot minor axis 106. The fourth elongate slot minor axis 106 may be disposed substantially perpendicular to the fourth elongate slot major axis 104. The fourth elongate slot width may be greater or longer than the fourth elongate slot height.

The third elongate slot major axis 98 and the fourth elongate slot major axis 104 may be disposed substantially parallel to each other. The third elongate slot major axis 98 and the fourth elongate slot major axis 104 may not be coaxially disposed with each other. Additionally, the third elongate slot minor axis 100 and the fourth elongate slot minor axis 106 may be disposed generally parallel to each other. The third elongate slot minor axis 100 and the fourth elongate slot minor axis 106 may not be coaxially disposed with each other.

The inboard second plate 90 may have additional elongate slots spaced apart from the third elongate slot 96 and the fourth elongate slot 102. For example, a pair of third elongate slots 96 and a pair of fourth elongate slots 102 may be provided. The additional elongate slots may be mirrored about an axis of symmetry with a similar configuration as the third elongate slot 96 and the fourth elongate slot 102.

Referring to FIG. 1, the first bracket assembly 70 and the second bracket assembly 110 each may be configured to receive a first control arm assembly 50 and a second control arm assembly 60 between the outboard first plate 72 and the inboard second plate 90.

The first control arm assembly 50 may include a first lower control arm 52 and/or a second lower control arm 54. As is best shown in FIG. 2A, the first lower control arm 52 may extend from the first bracket assembly 70 to the first axle assembly 30. The second lower control arm 54 may extend from the first bracket assembly 70 to the second axle assembly 34.

The second control arm assembly 60 may include a first upper control arm 62 and/or a second upper control arm 64. A portion of the first upper control arm 62 may extend from the bracket assembly 70 to the first axle assembly 30. Another portion of the first upper control arm 62, such as a connecting rod, may extend from the first bracket assembly 70 to the second bracket assembly 110 or from the first upper control arm 62 associated with the first bracket assembly 70 to the first upper control arm 62 associated with the second bracket assembly 110. A portion of the second upper control arm 64 may extend from the first bracket assembly 70 to the second axle assembly 34. Another portion of the second upper control arm 64, such a connecting rod, may extend from the first bracket assembly 70 to the second bracket assembly 110 or between the second upper control arms 64.

The first lower control arm 52 may be disposed proximate and may engage a fastener 120. The fastener 120 may facilitate mounting of the first lower control arm 52 to the first bracket assembly 70. For instance, the first lower control arm 52 may be configured to receive the fastener 120. Alternatively, the fastener 120 may extend from a portion of the first lower control arm 52. The fastener 120 may have any suitable configuration. For instance, the fastener 120 may include a bolt having a shank and a nut. The shank of the fastener 120 may extend through the first elongate slot 78, a portion of the first lower control arm 52, a bushing assembly, and the third elongate slot 96. The bushing assembly may include a rubber-metal bushing and a thrust washer.

The first lower control arm 52 may be configured to receive another fastener. The fastener may facilitate mounting of the first lower control arm 52 to the first axle assembly 30. The fastener may extend through a portion of the first lower control arm 52, a bushing assembly, and a portion of the first axle assembly 30, such as a bracket extending from the first axle assembly 30. The bushing assembly may include a rubber-metal bushing and a thrust washer.

The second lower control arm 54 may be mounted to the first bracket assembly 70 and the second axle assembly 34 in a similar manner as the first lower control arm 52 is mounted to the first bracket assembly 70 and the first axle assembly 30.

The first upper control arm 62 may be disposed proximate and may engage a fastener 130. The fastener 130 may facilitate mounting of the first upper control arm 62 to the bracket assembly 70. For instance, the fastener 130 may be configured to receive the fastener 130. Alternatively, the fastener 130 may extend from a portion of the first upper control arm 62. The fastener 130 may have any suitable configuration. For instance, the fastener 130 may include a bolt having a shank and a nut. The shank of the fastener 130 may extend through the second elongate slot 84, a portion of the first upper control arm 62, a bushing assembly, and the fourth elongate slot 102.

The first upper control arm 62 may be configured to receive another fastener. The fastener may facilitate mounting of the first upper control arm 62 to the first axle assembly 30. The fastener may extend through a portion of the first upper control arm 62, a bushing assembly, and a portion of the first axle assembly 30, such as a bracket extending from the first axle assembly 30.

The second upper control arm 64 may be mounted to the first bracket assembly 70 and the second axle assembly 34 in a similar manner as the first upper control arm 62 is mounted to the first bracket assembly 70 and the first axle assembly 30.

Figure 3:
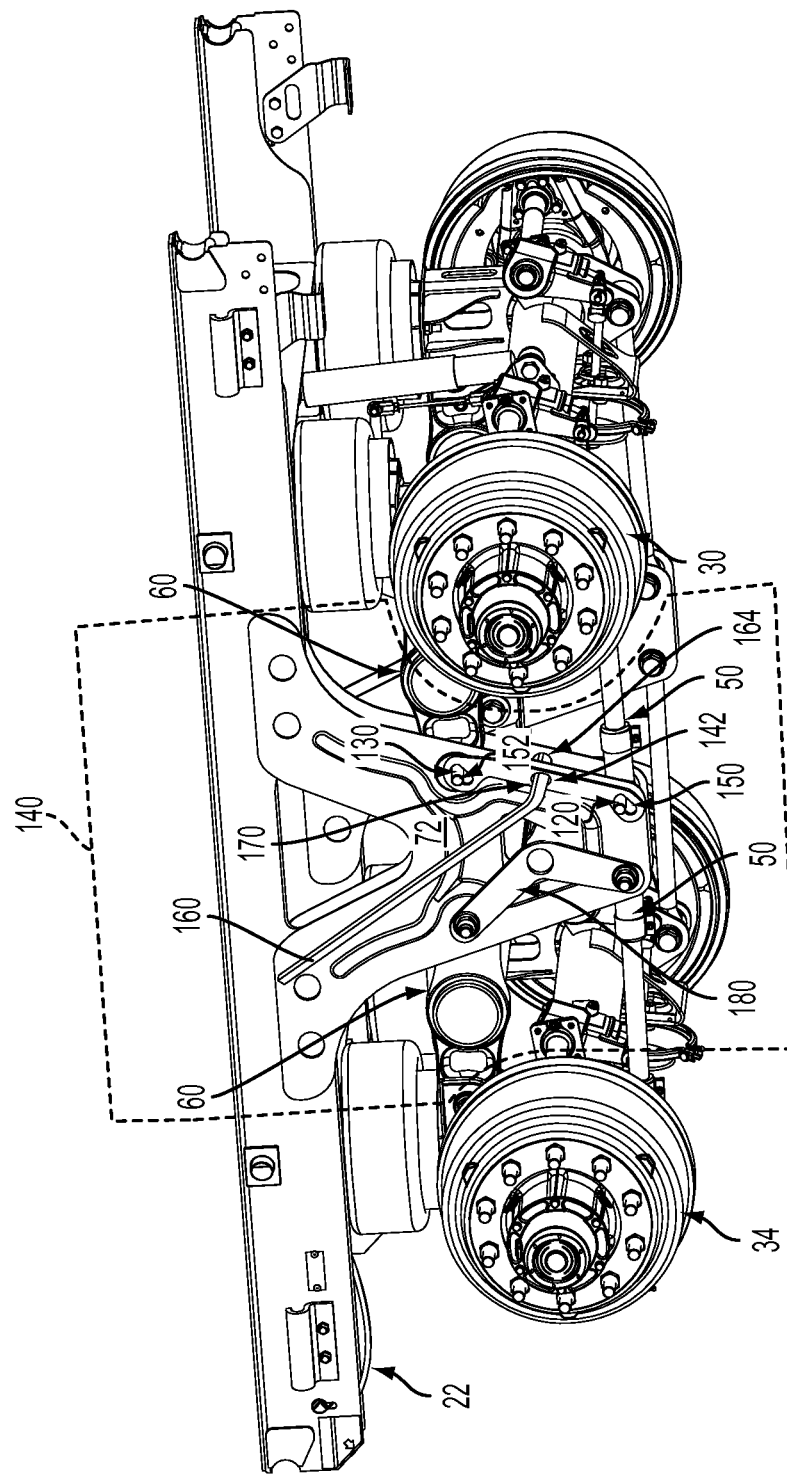
FIG. 3 is a perspective view of an axle suspension system and another embodiment of an axle alignment system.

Referring to FIG. 3, the axle suspension system 10 may be provided with an axle alignment system 140 that may be configured to adjust the alignment of the first axle assembly 30 and/or the second axle assembly 34. The alignment of the first axle assembly 30 and the second axle assembly 34 may adjusted relative to a kingpin or other suitable alignment reference to ensure that axle suspension system 10 is pulled in a straight line behind the vehicle. Proper alignment may set the wheels and tires of the wheel hub assemblies 40 into a position that enhances tire performance and helps evenly distribute tire wear.

The kingpin may be spaced apart from the first axle assembly 30 and the second axle assembly 34 and may be disposed between the first rail 22 and the second rail 24 of the frame assembly 20. The kingpin may be configured to couple the trailer provided with the axle suspension system 10 to the vehicle or tractor that may pull the trailer. The kingpin may slidably engage a slot in a skidplate that may be disposed on the vehicle and a locking feature may close about the kingpin to couple the trailer to the tractor.

The first axle assembly 30 may be aligned relative to the kingpin when the axle suspension system 10 is at a predetermined ride height. A first measurement may be taken from the kingpin to a first end of the first axle assembly 30 proximate the axis 32. A second measurement may be taken from the kingpin to a second end of the first axle assembly 30 proximate the axis 32. If a difference between the first measurement and the second measurement is greater than a first threshold difference, the first axle assembly 30 may require adjustment or alignment. The position of the first axle assembly 30 may be adjusted such that the first threshold difference between the first measurement and the second measurement is less than the first threshold difference.

The process of aligning the first axle assembly 30 may begin by loosening the fastener 120 and the fastener 130. The axle alignment system 140 may translate the fastener 120 along the first elongate slot major axis 80 and may translate the fastener 130 along the second elongate slot major axis 86.

After the first axle assembly 30 is properly aligned, the second axle assembly 34 may be aligned relative to the first axle assembly 30. A third measurement may be taken from the first end of the first axle assembly 30 proximate the axis 32 to a first end of the second axle assembly 34 proximate the axis 36. A fourth measurement may be taken from the second end of the first axle assembly 30 proximate the axis 32 to a second end of the second axle assembly 34 proximate the axis 36. If a difference between the third measurement and the fourth measurement is greater than a second threshold difference, the second axle assembly 34 may require adjustment or alignment.

The second axle assembly 34 and its associated fasteners may be aligned using a similar process as discussed above with respect to the first axle assembly 30.

In some situations, a person servicing the axle suspension system 10 may attempt to adjust the position of the first axle assembly 30 or second axle assembly 34 without loosening both the fastener 120 and fastener 130. Should only the fastener 120 be loosened, the bushing assembly associated with the first upper control arm 62 may experience a preload that may reduce bushing assembly life. Should only the fastener 130 be loosened, the bushing assembly associated the first lower control arm 52 may experience a preload that may reduce bushing assembly life.

In an effort to obviate the possible preloading of the bushing assemblies, the axle alignment system 140 may be provided with an alignment plate 142. The alignment plate 142 may be configured such that the fastener 120 and the fastener 130 are both loosened prior to adjusting the alignment of the first axle assembly 30 and the second axle assembly 34 to avoid preloading the bushing assemblies.

Referring to FIGS. 1 2A and 2B, the alignment plate 142 may be disposed proximate the outboard first plate 72. The alignment plate 142 may have a first surface 144 that may be disposed proximate the first surface 74 of the outboard first plate 72. The alignment plate 142 may have a second surface 146 that may be disposed opposite the first surface 144.

The alignment plate 142 may have a first opening 150 that may be disposed proximate and may be aligned with the first elongate slot 78 of the outboard first plate 72. The first opening 150 may receive fastener 120. A first weld boss may be provided on the first surface 144 proximate the first opening 150. The alignment plate 142 may have a second opening 152 that may be spaced apart from the first opening 150 and that may be disposed proximate the second elongate slot 84 of the outboard first plate 72. The second opening 152 may receive fastener 130. A second weld boss may be provided on the first surface 144 proximate the second opening 152.

Force may be applied to the alignment plate 142 to move the alignment plate 142 with respect to the bracket assembly 70, 110 by a variety of methods, as will be discussed in more detail below. The force applied may cause the alignment plate 142 to forcibly engage the shank of fastener 120 and/or the shank of fastener 130. The forcible engagement of the alignment plate 142 with shank of the fastener 120 may translate the fastener 120 along the first elongate slot major axis 80 and the third elongate slot major axis 98. The forcible engagement of the alignment plate 142 with the shank of the fastener 130 may translate the fastener 130 along the second elongate slot major axis 86 and the fourth elongate slot major axis 104.

The fastener 120 and the fastener 130 may translate substantially simultaneously to position the first axle assembly 30 with respect to the bracket assembly 70, 110 to align the first axle assembly 30. The axle alignment process may be repeated on a second alignment plate to align the second axle assembly 34.

Referring to FIG. 3, an axle suspension system having a different configuration of the axle alignment system 140 is shown. The first opening 150 and the second opening 152 of the alignment plate 142 may have a circular or slotted configuration. In a circular configuration, the first opening 150 may have a first diameter and the second opening 152 may have a second diameter. The first diameter and the second diameter may be substantially equal in one or more embodiments.

Force may be applied to the alignment plate 142 with a pry bar 160. In such a configuration, the outboard first plate 72 of the bracket assembly 70 may have a clearance hole 162, as is best shown in FIG. 2A. The clearance hole 162 may be disposed between the first elongate slot 78 and the second elongate slot 84. The clearance hole 162 may be configured as a generally elongate slot having a major axis that may extend between the first elongate slot 78 and the second elongate slot 84 and that may extend at an angle with respect to at least one of the first elongate slot minor axis 82 of the and the second elongate slot minor axis 88.

Referring to FIGS. 2B and 3, the inboard second plate 90 of a bracket assembly 70, 110 may be provided with a pry feature 164 that may be disposed between the third elongate slot 96 and the fourth elongate slot 102. The pry feature 164 may be a hole that may be sized to receive a portion of the pry bar 160, such as an end of the pry bar 160. The pry feature 164 may alternatively be a welded washer, tab, recess or the like that may be formed on the inboard second plate 90.

Referring to FIG. 1, the alignment plate 142 may be provided with a third opening 170 that may be disposed between the first opening 150 and the second opening 152. The third opening 170 may be proximately aligned with the clearance hole 162. The third opening 170 and the clearance hole 162 may be sized such that a portion of the pry bar 160 may extend through the third opening 170 and the clearance hole 162 to engage the pry feature 164 disposed on the inboard second plate 90, as shown in FIG. 3.

Movement of the pry bar 160 while engaged with the pry feature 164 may cause a portion of the pry bar 160 to engage a portion of the alignment plate 142. Force exerted by the pry bar 160 upon the alignment plate 142 may move the alignment plate 142 with respect to the bracket assembly 70, 110 to position the fastener 120 and the fastener 130 to align the first axle assembly 30. This procedure may be repeated to align the second axle assembly 34. Nuts associated with the fasteners may be tightened to secure and inhibit movement of the fasteners 120, 130 after alignment is obtained.

Referring to FIG. 3, the clearance hole 162 and the pry feature 164 may be positioned relative to each other to permit pry bar movement within a clearance zone between the tires. In some scenarios the tires may restrict access of the pry bar 160 to the axle alignment system 140. Therefore, an alignment plate 180 may have a generally arcuate or boomerang shape, curving towards a center of the bracket assembly 70, 110. This shape may move a center point for the pry bar 160 closer to the center of the bracket assembly 70, 110 to permit additional clearance between the tires and the pry bar 160.

Figure 4:
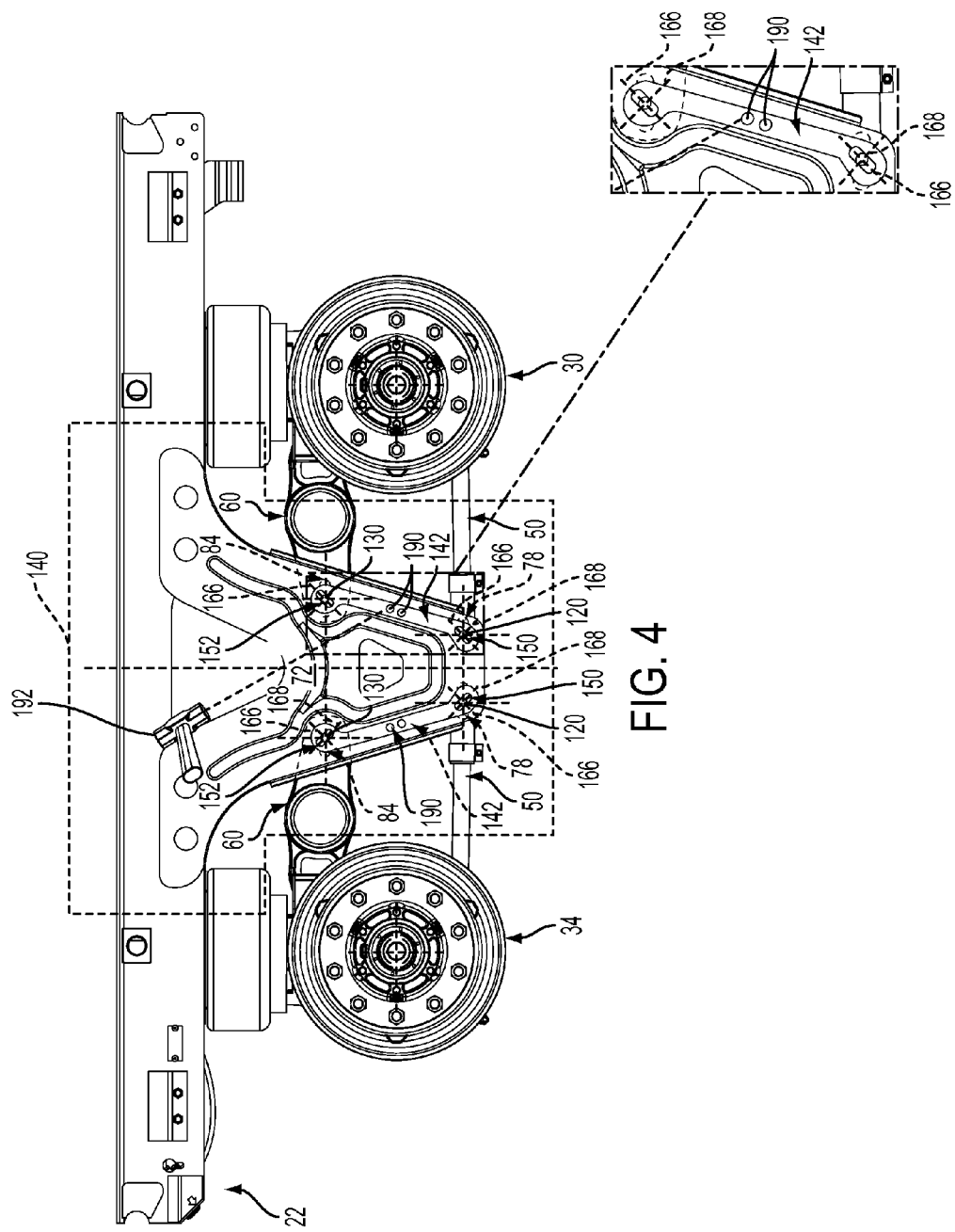
FIG. 4 is a side view of an axle suspension system and another embodiment of an axle alignment system.

Referring to FIG. 4, an axle suspension system having another configuration of an axle alignment system 140 is shown. The first opening 150 and the second opening 152 of the alignment plate 142 may be configured as an oval opening or a substantially linear elongated slot. Each opening 150, 152 may have a first width extending along a first major axis 166 and a first height extending along a first minor axis 168. The first major axis 166 may be disposed substantially perpendicular to the first minor axis 168 and the first width may be greater than the first height. The first and second openings 150, 152 may have substantially the same configuration in one or more embodiments. In addition, the first major axis 166 of the first opening 150 may be disposed substantially parallel to the first major axis 166 of the second opening 152 and the first major axes 166 may not be coaxially disposed with each other. The first major axis 166 of the first opening 150 may be disposed at an angle in a substantially nonparallel relationship with the first elongate slot major axis 80. The first major axis 166 of the second opening 152 may be disposed at an angle in a substantially nonparallel relationship with the second elongate slot major axis 86.

The alignment plate 142 may have an alignment feature 190. The alignment feature 190 may protrude or extend from the alignment plate 142. For example, the alignment feature 190 may be disposed proximate the second surface 146 of the alignment plate 142 and may extend away from the alignment plate 142 and the outboard first plate 72. In at least one embodiment, the alignment feature 190 may be configured as one or more pins that may be disposed between the first opening 150 and the second opening 152. In at least one embodiment, the alignment feature 190 may be configured as a guide plate having a generally rectangular shape. The clearance hole 162 may be configured to receive a portion of the guide plate. The clearance hole 162 may be sized to be larger than guide plate to allow the guide plate to traverse within the clearance hole 162 in response to a force applied to the guide plate.

Force may be applied to the alignment feature 190 to adjust the position of the alignment plate 142 and its associated fasteners 120, 130 to align an axle assembly, which may thereby move a corresponding control arm relative to the bracket assembly 70, 110. For example, force may be applied by a tool 192, like a hammer, mallet, or the like. The different angular positioning between the first opening 150 and the first and third elongate slots 78, 96 and between the second opening 152 and the second and fourth elongate slots 84, 102 may allow one or more fasteners 120, 130 to translate laterally and/or longitudinally in response to force exerted on the alignment plate 142.

Figure 5:
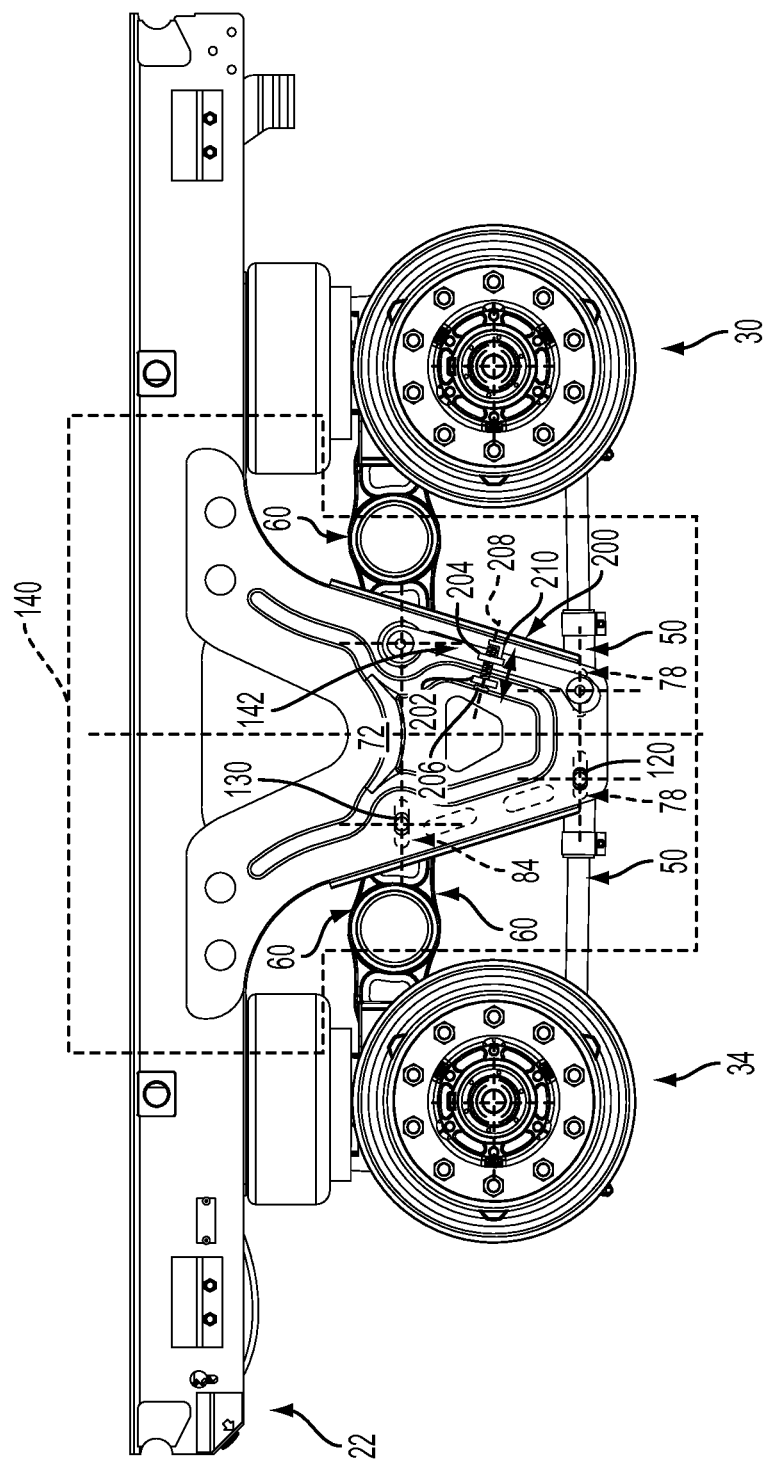
FIG. 5 is a side view of an axle suspension system and another embodiment of an axle alignment system.

Referring to FIG. 5, an axle suspension system having another configuration of an axle alignment system 140 is shown. In this embodiment, a drive assembly 200 may be provided to translate the alignment plate 142 relative to the bracket assembly 70 to adjust the position of the fastener 120 and/or the fastener 130 to align at least one axle assembly.

The outboard first plate 72 may have a first bracket 202 that may extend from the outboard first plate 72. The first bracket 202 may have a clearance hole and may be generally U-shaped. The alignment plate 142 may have an alignment plate bracket 204 that may extend from the second surface 146 of the alignment plate 142. The alignment plate bracket 204 may be provided with a threaded hole and a retainer 210 or locking tab that may be disposed proximate the threaded hole. The first bracket 202 may be spaced apart from the alignment plate bracket 204. The threaded hole and the clearance hole may be coaxially aligned.

A drive mechanism may interconnect the first bracket 202 and the alignment plate bracket 204. The drive mechanism may be a linkage 206 that may extend along an axis 208 between the first bracket 202 and the alignment plate bracket 204. The linkage 206 may be a ball screw, a roller screw, a captive bolt, a lead screw, a linear actuator, a worm drive, or the like. The drive assembly 200 may translate rotary motion of the linkage 206 to linear motion of the first bracket 202 relative to the alignment plate bracket 204, or vice versa.

A first portion of the linkage 206 may be retained by the first bracket 202 and the body of the linkage 206 may extend through the clearance hole to permit rotation of the linkage 206. A second portion of the linkage 206 may engage the threaded hole of the alignment plate bracket 204.

The rotation of the linkage 206 about the axis 208 in a first direction may drive the alignment plate 142 via the alignment plate bracket 204 away from the first bracket 202. The rotation of the linkage 206 about the axis 208 in a second direction may drive the alignment plate 142, via the alignment plate bracket 204 toward the first bracket 202.

The driving of the alignment plate 142 may move the alignment plate 142 with respect to the bracket assembly 70 to position the fastener 120 with respect to the first elongate slot 78 and the third elongate slot 96 and/or position the fastener 130 with respect to the second elongate slot 84 and the fourth elongate slot 102 to position the first axle assembly 30 with respect to the bracket assembly 70. A similar alignment plate 142 and drive mechanism or linkage 206 may be provided to position the second axle assembly 34.

In at least one embodiment, a drive mechanism including an eccentric washer or eccentric collar as disclosed in U.S. Pat. No. 8,528,920, may be disposed proximate the first control arm and the second control arm. The disclosure of U.S. Pat. No. 8,528,920 is assigned to the assignee of the present application is incorporated herein by reference in its entirety. The eccentric washer may drive the position of the fastener 120 and/or the fastener 130 by engaging alignment blocks disposed on the outboard first plate 72 of the bracket assembly 70. The alignment blocks may trap the eccentric washer to prevent the eccentric washer from moving fore or aft as the eccentric washer is rotated.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle alignment system comprising:
   an axle assembly;
   a bracket assembly including a first plate having a first elongate slot and a second elongate slot, wherein the first and second elongate slots each have a major axis and a minor axis;
   an alignment plate that has a first surface disposed proximate the first plate, a second surface disposed opposite the first surface, an alignment feature that is disposed proximate the second surface and extends away from the first plate, a first opening aligned with the first elongate slot, and a second opening aligned with the second elongate slot, wherein the first opening and the second opening are each configured as an elongate slot having a major axis and a minor axis disposed substantially perpendicular to the major axis, wherein the major axes of the first and second openings are disposed nonparallel to the major axes of the first and second elongate slots, respectively;
   a lower control arm that extends between the axle assembly and the bracket assembly; and
   an upper control arm that extends between the axle assembly and the bracket assembly;
   wherein the first elongate slot and the first opening receive a first fastener that mounts the lower control arm to the bracket assembly and the second elongate slot and the second opening receive a second fastener that mounts the upper control arm to the bracket assembly.

2. The axle alignment system of claim 1 wherein force exerted on the alignment feature moves the alignment plate and at least one of the lower control arm and the upper control arm relative to the bracket assembly.

3. The axle alignment system of claim 1 wherein the major axis of the first elongate slot extends from a first end of the first elongate slot to a second end of the first elongate slot such that the major axis of the first elongate slot is longer than the minor axis of the first elongate slot.

4. The axle alignment system of claim 3 wherein the major axis of the second elongate slot extends from a first end of the second elongate slot to a second end of the second elongate slot such that the major axis of the second elongate slot is longer than the minor axis of the second elongate slot.

5. The axle alignment system of claim 4 wherein the minor axes of the first and second elongate slots are disposed substantially perpendicular to the major axes of the first and second elongate slots, respectively.

6. The axle alignment system of claim 3 wherein the major axes of the first and second openings of the alignment plate extend at an angle with respect to the lower and upper control arms.

7. The axle alignment system of claim 1 wherein force exerted on the alignment feature translates the first fastener along the first elongate slot and the first opening.

8. The axle alignment system of claim 7 wherein force exerted on the alignment feature translates the second fastener along the second elongate slot and the second opening.

9. The axle alignment system of claim 1 wherein the major axis of the first opening is disposed substantially parallel to the major axis of the second opening.

10. The axle alignment system of claim 1 wherein the first elongate slot and the second elongate slot extend from the first surface to the second surface.

* * * * *